United States Patent
Haynes et al.

(10) Patent No.: US 8,420,225 B2
(45) Date of Patent: Apr. 16, 2013

(54) METALLIC LAMINATE COMPOSITE

(75) Inventors: Michael Haynes, Attleboro, MA (US); Paul Galipeau, Holliston, MA (US)

(73) Assignee: EMS Engineered Materials Solution, LLC, Attleboro, MA (US)

( * ) Notice: Subject to any disclaimer, the term of this patent is extended or adjusted under 35 U.S.C. 154(b) by 1019 days.

(21) Appl. No.: 12/180,931

(22) Filed: Jul. 28, 2008

(65) Prior Publication Data
US 2009/0169918 A1 Jul. 2, 2009

Related U.S. Application Data

(60) Provisional application No. 61/018,610, filed on Jan. 2, 2008.

(51) Int. Cl.
*B32B 15/01* (2006.01)
*B32B 15/04* (2006.01)
*B32B 15/18* (2006.01)

(52) U.S. Cl.
USPC .......................................... 428/617; 428/685

(58) Field of Classification Search ........................ None
See application file for complete search history.

(56) References Cited

U.S. PATENT DOCUMENTS

| | | | |
|---|---|---|---|
| 3,107,532 A * | 10/1963 | Lingnau | 60/529 |
| 3,219,423 A | 11/1965 | Sears et al. | |
| 3,454,373 A | 7/1969 | Ornstein | |
| 3,684,454 A | 8/1972 | Happ et al. | |
| 3,779,718 A | 12/1973 | Maisner | |
| 4,050,906 A * | 9/1977 | Ornstein et al. | 428/617 |
| 4,207,361 A * | 6/1980 | Izbicki | 427/328 |
| 4,217,398 A * | 8/1980 | Ty | 428/616 |

\* cited by examiner

*Primary Examiner* — Jennifer McNeil
*Assistant Examiner* — Adam Krupicka
(74) *Attorney, Agent, or Firm* — Smith, Gambrell & Russell

(57) ABSTRACT

A metallic laminate composite having a first alloy layer having a low coefficient of thermal expansion, and a second alloy layer having a higher coefficient of thermal expansion. Additional and optional layers may be included in the laminate composite.

16 Claims, 3 Drawing Sheets

METALLIC LAMINATE COMPOSITE

RELATED APPLICATIONS

This application is based upon and claims the benefit of priority from U.S. Provisional Application No. 61/018,610 filed on Jan. 2, 2008, the contents of which are expressly incorporated herein by reference.

TECHNICAL FIELD

This invention relates to a metallic laminate composite, and more particularly this invention relates to a metallic laminate composite having a plurality of layers having disparate coefficients of thermal expansion.

BACKGROUND

A thermostat metal or metallic laminate composite is a composite material that comprises two or more materials. The materials usually are in the form of a sheet or strip. Further, the two or more materials can be of any appropriate nature, metallic or otherwise. Thermostat metals can consist of multiple metallic components each having a different coefficient of thermal expansion, which are joined together with a metallurgical bond. The differing expansivities of the materials tend to alter the curvature as the temperature changes.

Accordingly, there is always a need for an improved metallic laminate composite. It is to this need, among others, that this invention is directed.

SUMMARY

This disclosure includes a metallic laminate composite comprising a first layer and a second layer in which the first layer has a low coefficient of thermal expansion and the second layer has a high coefficient of thermal expansion material. In one specific embodiment, the metallic laminate composite can comprise:

a first metallic alloy layer having a low coefficient of thermal expansion, selected from ferritic stainless steels, martensite or precipitation hardened stainless steels; and a second metallic alloy layer having a high coefficient of thermal expansion, composed of manganese, copper and nickel; and a third metallic allow to introduce or alter the properties of the laminate. For example, the nickel or copper can be incorporated to establish a desired electrical resistivity and flexivity, impart corrosion resistance, and to improve the thermal conductivity. As with many metallic laminate composites, one of ordinary skill in the art may include additional layers to impart properties into the structure.

The third layers may be made from nickel, low carbon steel, copper or copper alloys, austenitic stainless steel alloys, iron-nickel-chromium alloy, or iron-nickel (e.g. Invar) alloy, or blends thereof. The third metallic layer can be present as a layer that is sandwiched between the high and low expansion layers, or as a layer on the outside surface of the ferritic stainless layer. In other specific embodiments, the metallic laminate can include optional layers for further alter the properties of the laminate.

These and other aspects of the invention can be realized from a reading and understanding of the detailed description and drawings.

DEFINITIONS

As used herein, the term "metallic laminate composite" includes laminates having a plurality of layers, which includes laminates having two or three layers as well derivative laminates including, but not limited to, optional fourth, fifth layers or subsequent layers.

The term "bond" includes the adhering or joining of metallic layers though a metallurgical bond. Techniques for forming this bond include conventional processes, which include roll bonding (cold or hot), welding, explosion bonding, diffusion bonding, electrodepositing, adhesive bonding, and other techniques known by those with ordinary skill in the art.

The term "electrical resistivity" (inverse of electrical conductivity) is a measure of the materials resistance to electrical flow as a material property. It is readily converted to electrical resistance through consideration of the current carrying cross section.

The term "flexivity" is used to define the behavior of a laminate composite when a component metallic alloy with a high coefficient of thermal expansion is clad to a component metallic alloy with a lower coefficient of thermal expansion. For example, as temperature increases, either due to external ambient changes in temperature or by resistive heating when the bimetal carries current in an electrical application, the metallic material develops curvature. This curvature can be quantified by measurement of the curvature, or the inverse of the radius of curvature. Flexivity can be defined as the derivative change in the curvature per unit change in temperature.

Unless specifically indicated otherwise, all technical and scientific terms used herein have the same meaning as commonly understood by those of ordinary skill in the art to which this invention belongs. For purposes of the present invention, the forgoing terms are defined.

DETAILED DESCRIPTION

Embodiments of this invention include a metallic laminate composite comprising at least three layers of material. The first layer can have a low coefficient of thermal expansion material, and the second layer, which is bonded to the first layer, can have a higher coefficient of thermal expansion material. The third layer introduces or alters the properties of the laminate. By bonding or cladding the two layers of certain materials having different coefficients of thermal expansion together, the bonded material, the metallic laminate composite, can acquire the property of flexivity and can develop a curvature when heated, either by external ambient temperature changes or by resistive heating.

Figure 1:
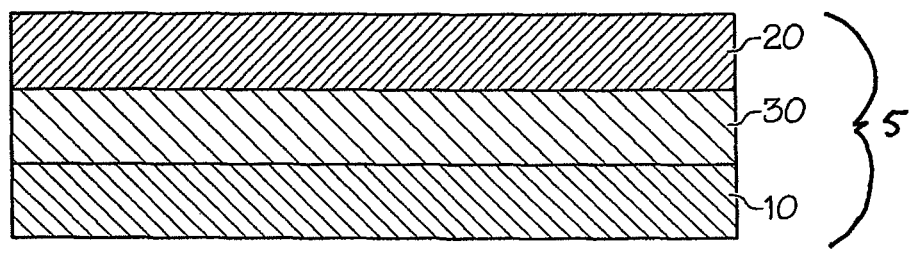
FIG. 1 shows an embodiment of the metallic laminate composite having three layers.

As shown in FIG. 1, one specific embodiment of the metallic laminate composite (5) comprises a first layer (10) and a second layer (20), that is, a bimetal laminate. The first layer (10) can have a low coefficient of thermal expansion material and can be of a ferritic stainless steel or precipitation hardened stainless steel. The desired high and/or low coefficients of the layers can be dependant on the combination of material used. In some examples, a low coefficient of thermal expansion for the first layer can range from about 4.8 (μin/in)/Deg. F. to about 6.8 (μin/in)/Deg. F. and a high coefficient of thermal expansion for the second layer can range from about 13 (μin/in)/Deg. F. to about 17 (μin/in)/Deg. F. In some examples a low coefficient of thermal expansion for the first layer can range from about 4.4 (μin/in)/Deg. F. to about 7.2 (μin/in)/Deg. F. and the high coefficient of thermal expansion for the second layer can range from about 12 (μin/in)/Deg. F. to about 18 (μin/in)/Deg. F.

These parameters set forth can be achieved using a variety of materials. In some examples, the first layer (10) can have less than 0.2% of carbon, less than 1.5% of manganese, less than 0.05% of phosphorous, less than 0.05% of sulfur, less than 1.5% silicon, less than 30% chromium, less than 1% nickel, less than 1.5% molybdenum, less than 1% titanium, less than 1% columbium, less than 1% nitrogen, less than 1% aluminum, and less than 0.05% magnesium. The second layer (20) can be a high coefficient of thermal expansion material such as an alloy having manganese, nickel and/or copper. In other examples, the second layer can consist between 63% to 80% manganese, 13% to 24% copper, 7% to 13% nickel, wherein the components are 100% of the layer. This combination of elements could be used to prepare a metallic laminate composite with a higher coefficient of expansion that had good workability.

Figure 2:
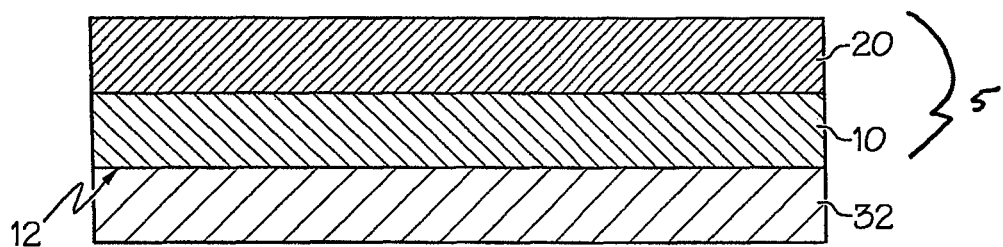
FIG. 2 shows another embodiment of the metallic laminate composite with another layer.

FIG. 1 also shows a third layer of material, in addition to the first and second layers. As with many metallic laminate composites, one of ordinary skill in the art may include additional layers to impart properties into the structure. For example, as shown in FIG. 1, the third layer (30) may be bonded between the first and second layers As shown in FIG. 2, another embodiment includes a third layer (32) that may be bonded to an outer surface (12) of the first layer.

This third layer 30, 32 may be of a nickel, copper or copper alloys, steel (including low-carbon steel), austenitic stainless steel alloy, iron-nickel chromium alloys or iron-nickel (e.g. Invar) alloys, such as Invar 36 (36% nickel, balance iron). Specific Invar alloys suitable with this embodiment include, but are not limited to, 36% nickel plus balance iron, 39% nickel plus balance iron, 42% nickel plus balance iron, 45% nickel plus balance iron, and 50% nickel plus balance iron.

In one specific embodiment, the third layer (30, 32) was copper. The inclusion of copper can help establish a desired electrical resistivity or to enhance welding and brazing properties. The third layer of copper may be on top the outer surface of the first layer 10 or between the first 10 and second layer 20.

In one specific embodiment, a high-manganese alloy layer is present in a volumetric ratio of from about 10% to about 75% of the system and is clad to the ferritic stainless steel or precipitation hardened stainless steel layer which is present in an amount of from about 10% to about 75% of the system. The material for the third layer can be present in an amount from about 2% to about 75%. When including the material for the optional third layer as an outer surface of the second layer of the high-manganese alloy (FIG. 2), it can be desirable to use as little material as functionally possible to achieve the desired effect. In one embodiment, the amount of material used as the third layer on the outer surface of the first layer of ferritic stainless steel ranges from about 2% to about 10%.

Figure 3:
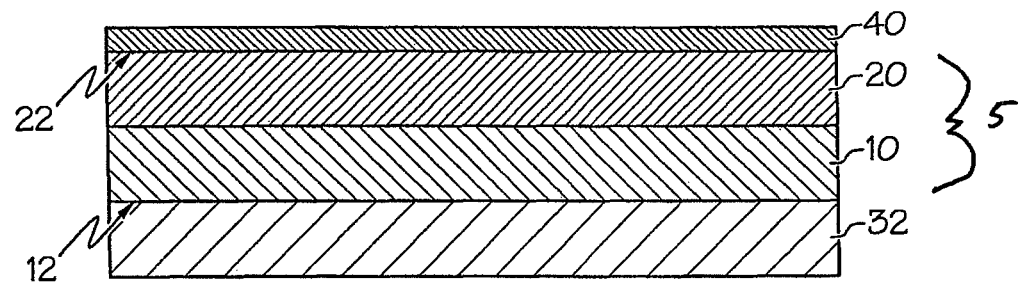
FIG. 3 shows another embodiment of the metallic laminate composite with additional layers.
Figure 4:
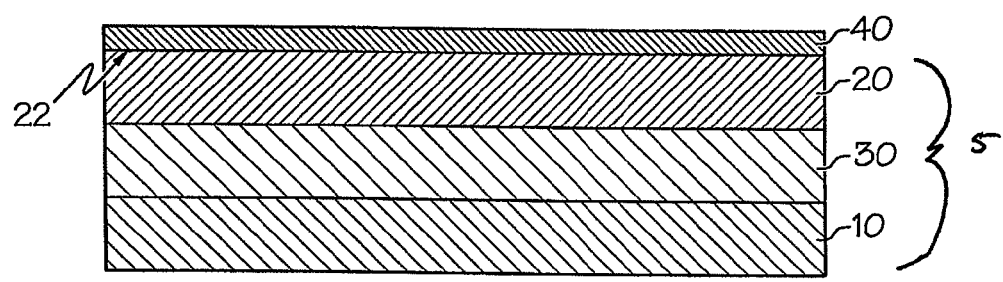
FIG. 4 shows another embodiment of the metallic laminate composite with another layer.
Figure 5:
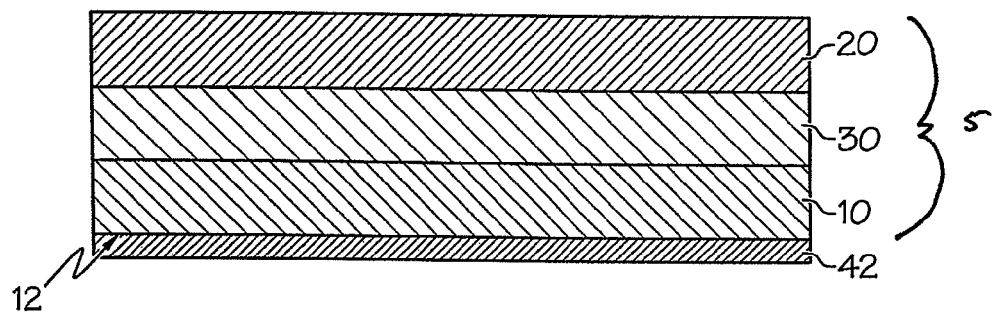
FIG. 5 shows another embodiment of the metallic laminate composite with another layer.

FIGS. 3-5 show other specific embodiments including a fourth layer of material, in addition to the first, second and third layers. For example, as shown in FIG. 3, a fourth layer (40) of material may be included on an outer surface (22) of the manganese alloy layer of a layer embodiment which comprises the first (10) and second (20) layers bonded together and a third layer (32) of Invar alloy bonded to an outer surface (12) of the stainless steel layer. Alternatively and as shown FIG. 4, the optional fourth layer (40) may be bound to an outer surface (22) of the manganese alloy layer of san embodiment which comprises the third layer (30) sandwiched between the first (10) and second (20) layers. Alternatively and as shown in FIG. 5 7, one embodiment of this invention can include a fourth layer of material (42) that is bound to an outer surface (12) of first layer (10) of the material according to FIG. 1.

The material of the fourth layer (40) can include nickel, copper, steel (including low-carbon steel), austenitic stainless steel alloy, iron-nickel chromium alloys or iron-nickel (Invar) alloys. Examples of materials suitable as the fourth layer include, but are not limited to, low carbon steel, copper or copper alloy, nickel, a 304 grade austenitic stainless steel alloy, a Fe22Ni3Cr alloy (22% nickel plus 3% chromium plus balance iron), a Fe20Ni6Cr alloy (20% nickel plus 6% chromium plus balance iron), a Fe19Ni2Cr alloy (19% nickel plus 2% chromium plus 0.5% carbon plus balance iron) and a Fe25Ni8Cr alloy (25% nickel plus 8% chromium plus balance iron). Other examples of materials useable as the fourth layer include, but are not limited to, 36% nickel plus balance iron, 39% nickel plus balance iron, 42% nickel plus balance iron, 45% nickel plus balance iron, and 50% nickel plus balance iron.

Figure 6:
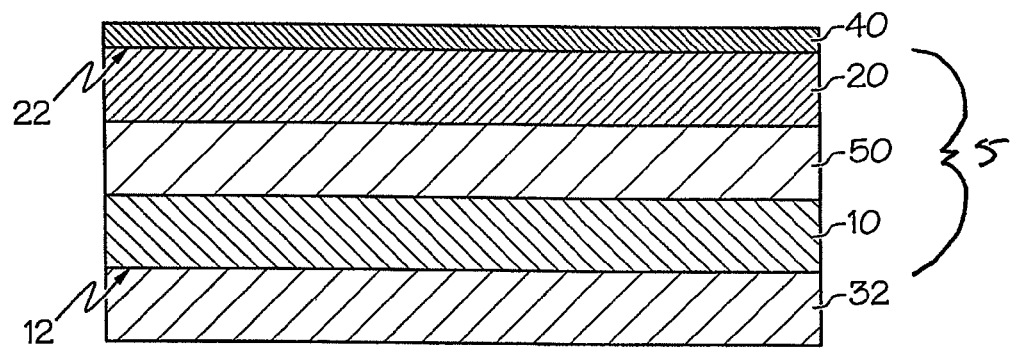
FIG. 6 shows another embodiment of the metallic laminate composite with two additional layers.

As shown in FIG. 6, a further embodiment includes a fifth layer 50 located between layers 10 and 20. The ferritic steel or martensitic steel, that is, the low coefficient of thermal expansion layer 10, has the third optional layer 32 on the outer surface 12 thereof and the manganese high coefficient of thermal expansion layer 20 has the optional layer fourth layer 40 on the outer surface 22. The material useable for each of the layers 10, 20, 32 and 40 as shown in FIG. 6 is as described hereinbefore for the three and four layer embodiments and the material for the optional fifth layer 50 can include nickel, copper or copper alloys, steel (including low-carbon steel), austenitic stainless steel alloy, or iron-nickel chromium alloys.

Another embodiment includes a method for preparing a metallic laminate composite comprising (a) selecting a first layer having a low coefficient of thermal expansion material comprised of a ferritic stainless steel or hardened stainless steel, wherein the low coefficient of thermal expansion is between about 4.4 (.mu.in/in)/Deg. F. to about 7.2 (mu.in/in)/(Deg. F.); (b) selecting a second layer having a high coefficient of thermal expansion material comprising/composed of an alloy comprising manganese, nickel and copper, wherein and the high coefficient of thermal expansion is between 12 (.mu.in/in)/Deg. F. to about 18 (.mu.in/in)/(Deg. F.); and (c) selecting a third layer to alter the properties of the laminate; and (d), bonding the first layer, second layer, and third layer.

The number and types of layers can be used to introduce or alter the properties of the laminate. For example, the nickel or copper can be incorporated as a surface layer for improved welding and brazing properties. Further, steel (including low carbon steel), nickel, copper (or copper alloys), and austenitic stainless steels can be used to establish a desired electrical resistivity and flexibility. The materials or layers can bonded or joined by conventional techniques known or later developed by persons with ordinary skill in the art. For example, such techniques include roll bonding, cold roll bonding, hot roll bonding, or circumferential welding of ingots, billets, or slabs (followed by cold-hot rolling). Other techniques include adhesive bonding, diffusion bonding, explosion bonding, electrodepositing of one layer onto a substrate of a second layer, or flame spraying of one layer onto a substrate of another layer.

Exemplary materials having a low coefficient of thermal expansion (e.g. about 4.8 (μin/in)/Deg. F. to about 6.8 (μin/in)/(Deg. F.) include materials)) are known by and available to those with ordinary skill in the art. Such materials include ferritic stainless steels or precipitation hardened stainless steels, including those commercially available, are useable. For example, the stainless steels can be members of the ferritic stainless steel family (e.g., AISI 18-2FM, 405, 409, 429, 430, and 442); and members of the martensitic stainless steel family (such as AISI 403, 410, 416, 420, 440C, 502, 503, and 504). Examples of some stainless steels suitable with specific embodiments of the invention include Series 400 stainless steels, which include AISI 439 stainless, as well as AISI 436, 441, 434, 430, 446, 444, 440, 431, 429, 422, 420, 416, 414, 410, 409, 405, 404, 403, 455, 453, 450, 448, 447, 435, 433, 425, 423, 406, 400. Other stainless steels include semi-martensitic (e.g. precipitation hardened 17-7), marensitic (e.g. precipitation hardened 17-4), precipitation hardened 15-5, and precipitation hardened 13-8 stainless steels. Although not a requirement, the stabilization of the ferrite phase can be employed if desired through precipitation of carbon and nitrogen by additions of titanium and/or nitrogen.

Further, exemplary materials having a high coefficient of thermal expansion are known by and available to those with ordinary skill in the art. Suitable alloys include alloys with between about 10% and about 23% of copper, between about 7% and about 16% nickel, with balance being manganese, less residual impurities. With respect to the material having the high coefficient of thermal expansion, the material is comprised of a manganese alloy comprised mainly of manganese with additions of nickel and copper. For example, this high-manganese alloy material is comprised of from about 10% to about 23% copper, from about 7% to about 16% nickel, with the balance being manganese and where the sum of these elements totals 100 weight percent, less residual impurities. Certain residual impurities could include, but are not limited to, silicon, phosphorous, sulfur, iron, chromium, carbon, and nitrogen. Other commercial compositional ranges for this manganese-based alloy are specified in Deutsches Institut für Normung (DIN) Specification 1715 as 10% copper to 18% copper plus 10% nickel to 16% nickel plus balance manganese.

It is understood that this invention can be used in an array of applications. Such applications and uses include, residential and industrial circuit breakers, thermometers, snap-action thermostats, thermostats to regulate room temperature, temperature regulation and control on appliances (e.g., irons, toasters, coffee makers, ovens, electric ranges, clothes dryers, hair dryers, deep fat fryers, electric frying pans, tea kettles, rice cookers, grills, waffle irons, and electric blankets), protection of fluorescent light ballasts from overheating, automotive fans, temperature monitoring and temperature recording for shipments of perishable goods, aircraft electrical circuits, opening and closing of vent doors for furnaces, heating systems, attics, and crawl spaces, electric motor and compressor overload protection, protecting circuitry in computers and peripheral surge protectors, assuring correct readings by gas meters, and protecting circuits in large transformers. Such uses and applications, among others, can be recognized by those with ordinary skill in the art.

Various specific embodiments of the metallic laminate composite can be utilized in temperature-measuring devices or temperature-actuated devices where conventional metallic laminate composite materials are traditionally used.

EXAMPLES

Example 1

An example metallic laminate composite is comprised of high manganese alloy in volumetric ratio of 23.6%, clad to 439 Stainless Steel in volumetric ratio of 49.7%, clad to Iron-36 Wt % nickel alloy (Invar 36) in volumetric ratio of 26.7%. The high manganese alloy is comprised nominally of 72% Manganese, 18% Copper, and 10% Nickel by weight. Actual measured flexivity was $139.8 \times 10^{-7}$ (in/in)/(Deg. F.), which differs from the predicted flexivity of $142.9 \times 10^{-7}$ (in/in)/(Deg. F.) by 2.2%. Actual measured electrical resistivity was 470.4 ohms circ. mil/ft (OCMF), which differs from the predicted electrical resistivity of 469.1 OCMF by 0.3%.

The thermal coefficients of expansion, electrical resistivity, and elastic modulus of each component were obtained through measurement or from literature sources. The thickness of each component in a laminate was measured on a polished, metallographic cross-section. This data was utilized to predict the metallic laminate composite flexivity (between 50 and 200 degrees Fahrenheit) and electrical resistivity at 75 degrees Fahrenheit. These predictions were compared to actual measurements per ASTM Standards.

Example 2

An example metallic laminate composite is comprised of high manganese alloy in volumetric ratio of 51.5%, clad to C10700 Copper in volumetric ratio of 17.6%, clad to 439 Stainless Steel in volumetric ratio of 30.9%. The high manganese alloy is comprised nominally of 72% Manganese, 18% Copper, and 10% Nickel by weight. Actual measured flexivity was $132.3 \times 10^{-7}$ (in/in)/(Deg. F.), which differs from the predicted flexivity of $131.5 \times 10^{-7}$ (in/in)/(deg. F.) by 0.6%. Actual measured electrical resistivity was 54.1 ohms circ. mil/ft (OCMF), which differs from the predicted electrical resistivity of 54.7 OCMF by 1.1%.

Example 3

An example metallic laminate composite is comprised of high manganese alloy in volumetric ratio of 39.8%, clad to N02201 in volumetric ratio of 42.2%, clad to 439 Stainless Steel in volumetric ratio of 18.0%. The high manganese alloy is comprised nominally of 72% Manganese, 18% Copper, and 10% Nickel by weight. Actual measured flexivity was $113.7 \times 10^{-7}$ (in/in)/(Deg. F.), which differs from the predicted flexivity of $115.8 \times 10^{-7}$ (in/in)/(Deg. F.) by 1.8%. Actual measured electrical resistivity was 105.2 ohms circ. mil/ft (OCMF), which differs from the predicted electrical resistivity of 107.3 OCMF by 1.9%.

Example 4

A metallic laminate composite having a third layer of high-manganese alloy in volumetric ratio of 10% to 75%, clad to lower-purity copper alloy (electrical resistivity=20 to 50 OCMF) in volumetric ratio of 2% to 75%, clad to ferritic stainless steel or precipitation hardened stainless steel in volumetric ratio of 10 to 75%. The lower-purity copper layer can be sandwiched between the high-manganese alloy layer and ferritic stainless steel or precipitation hardened stainless steel. Electrical resistivity of these systems can range from 25 OCMF for 75% copper at 20 OCMF to 500 OCMF for 2% copper at 50 OCMF.

Example 5

A metallic laminate composite having a third layer of lower-purity copper alloy (electrical resistivity=20 to 50 OCMF) in volumetric ratio of 2% to 10%, clad to high-manganese alloy in volumetric ratio of 10% to 75%, clad to ferritic stainless steel or precipitation hardened stainless steel in volumetric ratio of 10 to 75%. The high-manganese layer can be sandwiched between lower-purity copper layer and ferritic stainless steel or precipitation hardened stainless steel. Electrical resistivity of these systems can range from 150 OCMF for 10% copper at 20 OCMF to 500 OCMF for 2% copper at 50 OCMF.

Example 6

A metallic laminate composite having a third layer of high-manganese alloy in volumetric ratio of 10% to 75%, clad to high-purity nickel (electrical resistivity=45 to 55 OCMF) in volumetric ratio of 2% to 75%, clad to ferritic stainless steel or precipitation hardened stainless steel in volumetric ratio of 10 to 75%. The high-purity nickel layer can be sandwiched between the high-manganese alloy layer and ferritic stainless steel or precipitation hardened stainless steel. Electrical resistivity of these systems can range from 65 OCMF for 75% nickel to 500 OCMF for 2% nickel.

Example 7

A metallic laminate composite having a third layer of high-manganese alloy in volumetric ratio of 10% to 75%, clad to ferritic stainless steel or precipitation hardened stainless steel in volumetric ratio of 10 to 75%, clad to Iron-36 Wt % nickel alloy (Invar 36) in volumetric ratio of 2% to 75%. The ferritic or martensitic layer can be sandwiched between the high-manganese alloy layer and the Invar 36 alloy. Electrical resistivity of these systems can range from 405 OCMF to 775 OCMF.

Example 8

A metallic laminate composite may include a third and fourth layer of Iron-22% Ni-3% Cr alloy in volumetric ratio of 2% to 10%, clad to high-manganese alloy in volumetric ratio of 10% to 75%, clad to ferritic stainless steel or precipitation hardened stainless steel in volumetric ratio of 10 to 75%, clad to Iron-36 Wt % nickel alloy (Invar 36) in volumetric ratio of 2% to 75%. The ferritic or martensitic layer can be sandwiched between the high-manganese alloy layer and the Invar alloy layer. The high-manganese layer can be sandwiched between the ferritic or martensitic stainless layer and the Fe-22% Ni-3% Cr alloy layer. Electrical resistivity of these systems can range from 425 OCMF to 775 OCMF.

Example 9

A metallic laminate composite, which includes a third and fourth layer, is comprised of an iron-nickel-chromium alloy (austenitic stainless steel, Fe22Ni3Cr alloy, Fe20Ni6Cr alloy, Fe19Ni2Cr alloy, or a Fe25Ni8Cr alloy) in volumetric ratio of 2% to 10%, clad to high-manganese alloy in volumetric ratio of 10% to 75%, clad to low-carbon steel in volumetric ratio of 2% to 75%, clad to ferritic stainless steel or precipitation hardened stainless steel in volumetric ratio of 10 to 75%. The low-carbon steel layer can be sandwiched between the high-manganese alloy layer and the ferritic stainless steel or precipitation hardened stainless steel. The high-manganese layer can be sandwiched between the 2 to 10% iron-nickel-chromium alloy and the low-carbon steel layer. Electrical resistivity of these laminates can range from 100 OCMF to 500 OCMF.

Example 10

A metallic laminate composite, which includes an optional third and fourth layer, is comprised of a high-manganese alloy in volumetric ratio of 10% to 75%, clad to low-carbon steel in volumetric ratio of 2% to 75%, clad to a ferritic stainless steel or precipitation hardened stainless steel in volumetric ratio of 10 to 75%, clad to an iron-nickel alloy (36% nickel plus balance iron, 39% nickel plus balance iron, 42% nickel plus balance iron, 45% nickel plus balance iron, or 50% nickel plus balance iron) in volumetric ratio of 2% to 40%. The low-carbon steel layer can be sandwiched between the high-manganese alloy layer and the ferritic stainless steel or precipitation hardened stainless steel. The ferritic stainless steel or precipitation hardened stainless steel layer can be sandwiched between the 2 to 40% iron-nickel alloy and the low-carbon steel layer. Electrical resistivity of these laminates can range from 100 OCMF to 650 OCMF.

Example 11

A metallic laminate composite, which includes an optional fourth layer, is comprised of high purity copper in volumetric ratio of 2% to 10%, clad to high-manganese alloy in volumetric ratio of 10% to 75%, clad to high purity copper in volumetric ratio of 2% to 75%, clad to ferritic stainless steel or precipitation hardened stainless steel in volumetric ratio of 10 to 75%. The 2% to 75% high-purity copper layer can be sandwiched between the high-manganese alloy layer and the ferritic stainless steel or precipitation hardened stainless steel. The high-manganese layer can be sandwiched between the 2% to 10% high-purity copper layer and the 2 to 75% high purity copper layer. Electrical resistivity of these laminates can range from 15 OCMF to 200 OCMF.

Example 12

A metallic laminate composite, which includes an optional fourth layer, is comprised of a high-manganese alloy in volumetric ratio of 10% to 75%, clad to high purity copper in volumetric ratio of 2% to 75%, clad to a ferritic stainless steel or precipitation hardened stainless steel in volumetric ratio of 10 to 75%, clad to an iron-nickel alloy (36% nickel plus balance iron, 39% nickel plus balance iron, 42% nickel plus balance iron, 45% nickel plus balance iron, or 50% nickel plus balance iron) in volumetric ratio of 2% to 40%. The high purity copper layer can be sandwiched between the high-manganese alloy layer and the ferritic stainless steel or precipitation hardened stainless steel. The ferritic stainless steel or precipitation hardened stainless steel layer can be sandwiched between the 2 to 40% iron-nickel alloy and the high purity copper layer. Electrical resistivity of these laminates can range from 15 OCMF to 300 OCMF.

Example 13

A metallic laminate composite, which includes an optional third and fourth layer, is comprised of an iron-nickel-chromium alloy (austenitic stainless steel, Fe22Ni3Cr alloy, Fe20Ni6Cr alloy, Fe19Ni2Cr alloy, or a Fe25Ni8Cr alloy) in volumetric ratio of 2% to 10%, clad to high-manganese alloy in volumetric ratio of 10% to 75%, clad to lower-purity copper in volumetric ratio of 2% to 75%, clad to ferritic stainless steel or precipitation hardened stainless steel in volumetric ratio of 10 to 75%. The lower-purity copper layer can be sandwiched between the high-manganese alloy layer and the ferritic stainless steel or precipitation hardened stainless steel. The high-manganese layer can be sandwiched between the 2 to 10% iron-nickel-chromium alloy and the lower-purity copper layer. Electrical resistivity of these laminates can range from 65 OCMF to 550 OCMF.

Example 14

A metallic laminate composite, which includes an optional fourth and fifth layer, is comprised of an iron-nickel-chromium alloy (austenitic stainless steel, Fe22Ni3Cr alloy, Fe20Ni6Cr alloy, Fe19Ni2Cr alloy, or a Fe25Ni8Cr alloy) in volumetric ratio of 2% to 10%, clad to high-manganese alloy in volumetric ratio of 10% to 75%, clad to a low carbon steel layer in volumetric ratio of 2% to 75%, clad to ferritic stainless steel or precipitation hardened stainless steel in volumetric ratio of 10 to 75%, clad to an iron-nickel alloy (36% nickel plus balance iron, 39% nickel plus balance iron, 42% nickel plus balance iron, 45% nickel plus balance iron, or 50% nickel plus balance iron) in volumetric ratio of 2% to 40%. The low carbon steel layer can be sandwiched between the high-manganese alloy layer and the ferritic stainless steel or precipitation hardened stainless steel. The high-manganese layer can be sandwiched between the 2 to 10% iron-nickel-chromium alloy and the low carbon steel layer. The ferritic or martensitic stainless layer can be sandwiched between the low carbon steel layer and the 2 to 40% iron-nickel alloy. Electrical resistivity of these laminates can range from 100 OCMF to 650 OCMF.

Example 15

A metallic laminate composite, which includes an optional fourth and fifth layer, is comprised of an iron-nickel-chromium alloy (austenitic stainless steel, Fe22Ni3Cr alloy, Fe20Ni6Cr alloy, Fe19Ni2Cr alloy, or a Fe25Ni8Cr alloy) in volumetric ratio of 2% to 10%, clad to high-manganese alloy in volumetric ratio of 10% to 75%, clad to high purity copper in volumetric ratio of 2% to 75%, clad to ferritic stainless steel or precipitation hardened stainless steel in volumetric ratio of 10 to 75%, clad to an iron-nickel alloy (36% nickel plus balance iron, 39% nickel plus balance iron, 42% nickel plus balance iron, 45% nickel plus balance iron, or 50% nickel plus balance iron) in volumetric ratio of 2% to 40%. The high purity copper layer can be sandwiched between the high-manganese alloy layer and the ferritic stainless steel or precipitation hardened stainless steel. The high-manganese layer can be sandwiched between the 2 to 10% iron-nickel-chromium alloy and the high purity copper layer. The ferritic or martensitic stainless layer can be sandwiched between the high purity copper layer and the 2 to 40% iron-nickel alloy. Electrical resistivity of these laminates can range from 15 OCMF to 300 OCMF.

Example 16

When making the metallic laminate composite system having four layers as shown in FIG. 3, the high-manganese alloy layer is present in a volumetric ratio of from about 10% to about 75% of the system and is clad to the ferritic stainless steel or precipitation hardened stainless steel layer which is present in an amount of from about 10% to about 75% of the system. The material for the Invar alloy layer is present in an amount of from about 2% to about 40% of the system and the material for the fourth layer, which is on the outer surface of the high-manganese alloy layer, is present in an amount of from about 2% to about 10% of the system, wherein the combined amount for all four layers totals one hundred percent. When including the material for the optional third and fourth layers, it can be desirable to use as little material as functionally possible to achieve the desired effect.

Example 17

When making the metallic laminate composite system having four layers as shown in FIG. 6, the high-manganese alloy layer is present in a volumetric ratio of from about 10% to about 75% of the system and the ferritic stainless steel or precipitation hardened stainless steel layer is present in an amount of from about 10% to about 75% of the system. The material for the third layer (30) is present in an amount of from about 2% to about 75% of the system and the material for the fourth layer, which is on the outer surface of the high-manganese alloy layer, is present in an amount of from about 2% to about 10% of the system, wherein the combined amount for all four layers totals one hundred percent. When including the material for the optional third and fourth layers, it is desirable to use as little material as functionally possible to achieve the desired effect.

Other derivative metallic laminate composites within the scope of the invention can be comprised of any of the above laminates that contain an outside layer of high-manganese alloy, with incorporation of nickel, copper, or tin plating on the high-manganese alloy. Plating can be sufficiently thin so that it does not affect thermostatic properties.

The above detailed description, and the examples, are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A metallic laminate composite comprising:
a first layer having a low coefficient of thermal expansion material and of a ferritic stainless steel or hardened stainless steel;
a second layer having a high coefficient of thermal expansion material and of an alloy comprising manganese, nickel and copper, wherein the low coefficient of thermal expansion is between about 4.4 ($\mu$in/in)/Deg. F. to about 7.2 ($\mu$in/in)/Deg. F., and the high coefficient of thermal expansion is between 12 ($\mu$in/in)/Deg. F. to about 18 ($\mu$in/in)/Deg. F., and
a third layer having between about 2% and about 50% of manganese and between about 10% and about 48% of ferritic steel.

2. The metallic laminate composite as claimed in claim 1, wherein the low coefficient of thermal expansion is between about 4.8 ($\mu$in/in)/Deg. F. to about 6.8 ($\mu$in/in)/Deg. F., and the high coefficient of thermal expansion is between about 13 ($\mu$in/in)/Deg. F. and about 17 ($\mu$in/in)/Deg. F.

3. The metallic laminate composite as claimed in claim 1, wherein the second layer has between about 10% and about 23% of copper, between about 7% and 16% nickel, and between about 1% and about 83% manganese.

4. The metallic laminate composite of claim 3, wherein the third layer is on an outer surface of the first layer and the fourth layer is on an outer surface of the second layer.

5. The metallic laminate composite of claim 1, wherein the ratio of the thickness of the material in the high coefficient of thermal expansion layer to the thickness of the material in the low coefficient of thermal expansion layer is selected from 50/50, 57/43 and 60/40 ratios.

6. The metallic laminate composite as claimed in claim 1, wherein the stainless steel is an AISI Series 400 stainless steel.

7. The metallic laminate composite as claimed in claim 1, wherein the first layer contains less than 1.5% of manganese, less than 0.05% of phosphorous, less than 0.05% of sulfur, less than that 1.5% silicon, less than 30% chromium, less than 1% nickel, less than 1.5% molybdenum, less than 1% titanium, less than 1% columbium, less than 1% nitrogen, less than 1% aluminum, and less than 0.05% magnesium.

8. The metallic laminate composite as claimed in claim 1, wherein the second layer is an alloy of elements selected from the group consisting of manganese, nickel, copper and combination thereof.

9. The metallic laminate composite as claimed in claim 1, wherein the second layer consists of between about 63% to about 80% manganese, about 13% to 24% copper, about 7% to 13% nickel; and the manganese, the copper and the nickel are 100% of the layer.

10. The metallic laminate composite as claimed in claim 1, wherein the stainless steel is martensite steel.

11. A metallic laminate composite comprising:
a first layer having a low coefficient of thermal expansion material and of a ferritic stainless steel or hardened stainless steel;
a second layer having a high coefficient of thermal expansion material and of an alloy comprising manganese, nickel and copper, wherein the low coefficient of thermal expansion is between about 4.4 ($\mu$in/in)/Deg. F. to about 7.2 ($\mu$in/in)/Deg. F., and the high coefficient of thermal expansion is between 12 ($\mu$in/in)/Deg. F. to about 18 ($\mu$in/in)/deg. F.; and,
a third layer of an iron-nickel alloy that is on an outer surface of the first layer.

12. A metallic laminate composite comprising a plurality of layers, wherein a first layer is a low coefficient of thermal expansion material comprised of a ferritic stainless steel or precipitation hardened stainless steel and a second layer is a high coefficient of thermal expansion material comprised of an alloy comprising manganese, nickel and copper, wherein the low coefficient of thermal expansion is between about 4.4 ($\mu$in/in)/Deg. F. to about 7.2 ($\mu$in/in)/Deg. F., and the high coefficient of thermal expansion is between 12 ($\mu$in/in)/Deg. F. to about 18 ($\mu$in/in)/Deg. F., and, third layer of a low-carbon steel, an austenitic stainless steel, or an iron-nickel alloy.

13. The metallic laminate composite as claimed in claim 12, wherein the high coefficient of thermal expansion material is comprised of from about 10% to about 23% copper and from about 7% to about 16% nickel, and manganese.

14. The metallic laminate composite as claimed in claim 12 wherein the first layer is semi-austenitic or martensite steel.

15. The metallic laminate composite as claimed in claim 12, wherein the first layer is AISI Series 400 grade stainless steel.

16. A temperature-measuring or temperature-actuated device comprising the metallic laminate composite of claim 12.

\* \* \* \* \*